US012317028B2

(12) United States Patent
Boothe et al.

(10) Patent No.: US 12,317,028 B2
(45) Date of Patent: May 27, 2025

(54) SPEAKER DRIVER ARRANGEMENT FOR IMPLEMENTING CROSS-TALK CANCELLATION

(71) Applicant: Apple Inc., Cupertino, CA (US)

(72) Inventors: Daniel K. Boothe, San Francisco, CA (US); Martin E. Johnson, Los Gatos, CA (US); Ismael H. Nawfal, Los Angeles, CA (US); Timothy J. Valentine, San Jose, CA (US); Stuart M. Nevill, Los Gatos, CA (US); Chanjuan Feng, San Jose, CA (US)

(73) Assignee: Apple Inc., Cupertino, CA (US)

( * ) Notice: Subject to any disclaimer, the term of this patent is extended or adjusted under 35 U.S.C. 154(b) by 42 days.

(21) Appl. No.: 17/819,897

(22) Filed: Aug. 15, 2022

(65) Prior Publication Data

US 2023/0077689 A1 Mar. 16, 2023

Related U.S. Application Data

(60) Provisional application No. 63/243,570, filed on Sep. 13, 2021.

(51) Int. Cl.

| | |
|---|---|
| ***H04R 1/26*** | (2006.01) |
| ***H04R 1/02*** | (2006.01) |
| ***H04R 3/12*** | (2006.01) |

(52) U.S. Cl.

CPC ............... *H04R 1/26* (2013.01); *H04R 1/028* (2013.01); *H04R 3/12* (2013.01); *H04R 2499/15* (2013.01)

(58) Field of Classification Search

CPC . H04R 3/12; H04R 1/26; H04R 1/025; H04R 2499/15

USPC ..................... 381/98–99, 306, 333, 304–305

See application file for complete search history.

(56) References Cited

U.S. PATENT DOCUMENTS

| | | | | | |
|---|---|---|---|---|---|
| 4,015,089 | A * | 3/1977 | Ishii | H04R 3/14 381/89 |
| 4,154,979 | A * | 5/1979 | Barker | H04R 3/04 381/98 |
| 4,180,706 | A * | 12/1979 | Bakgaard | H04R 3/002 381/99 |
| 4,207,963 | A * | 6/1980 | Klasco | H04R 1/2834 16/110.1 |
| 6,118,876 | A * | 9/2000 | Ruzicka | H04R 5/04 381/27 |

(Continued)

OTHER PUBLICATIONS

Duane H. Cooper, Jerald L. Bauck, "Prospects for Transaural Recording", Presented at the 85th Convention of the Audio Engineering Society, Los Angeles, Nov. 3-6, 1988, 17 pages.

(Continued)

*Primary Examiner* — Disler Paul

(74) *Attorney, Agent, or Firm* — Aikin & Gallant, LLP

(57) ABSTRACT

A multimedia device having a housing that includes a display screen, two tweeters, two mid-range drivers, and two woofers, which are integrated into the housing. Both woofers are disposed at a first distance from a center vertical axis of the housing in opposite horizontal directions, both tweeters are disposed at a second distance from the center vertical axis in the opposite horizontal directions, and both mid-range drivers are disposed at a third distance from the center vertical axis in opposite horizontal directions. In addition, both the first and second distances are greater than the third distance.

21 Claims, 5 Drawing Sheets

(56) References Cited

U.S. PATENT DOCUMENTS

| | | | | |
|---|---|---|---|---|
| 6,424,719 | B1 | 7/2002 | Elko et al. | |
| 9,756,446 | B2 | 9/2017 | Johnson et al. | |
| 10,063,984 | B2 | 8/2018 | Johnson et al. | |
| 10,524,080 | B1 | 12/2019 | Johnson et al. | |
| 10,652,687 | B2 | 5/2020 | Satongar et al. | |
| 10,656,672 | B2 * | 5/2020 | Youn | H04R 1/025 |
| 11,350,231 | B2 * | 5/2022 | Chabanne | H04S 3/002 |
| 11,786,933 | B2 * | 10/2023 | Hashimoto | H04R 3/04<br>381/98 |
| 2005/0053247 | A1 * | 3/2005 | Petronio | H04R 3/14<br>381/99 |
| 2020/0099883 | A1 * | 3/2020 | Buck | H04N 23/57 |
| 2022/0103946 | A1 * | 3/2022 | Zhou | H04R 1/2819 |

OTHER PUBLICATIONS

Yang et al.: "Improved sound separation using three loudspeakers", Acoustics Research Letters Online, [DOI 10.1121/1.1566419], Feb. 27, 2003, 7 pages.

* cited by examiner

SPEAKER DRIVER ARRANGEMENT FOR IMPLEMENTING CROSS-TALK CANCELLATION

This application claims the benefit of U.S. Provisional Patent Application No. 63/243,570, filed on Sep. 13, 2021, which application is incorporated herein by reference.

FIELD

An aspect of the disclosure relates to an audio device that has a speaker driver arrangement for implementing cross-talk cancellation. Other aspects are also described.

BACKGROUND

Multichannel sound systems may perform various audio processing techniques to improve listener experience. For instance, some systems may be designed to output high-quality three-dimensional (3D) audio. To do this, some systems may produce binaural audio signals that are used to drive two headphone speakers to create a 3D stereo sound sensation for the listener.

SUMMARY

An aspect of the disclosure is a multimedia device having an arrangement of speaker drivers for implementing cross-talk cancellation. The device includes a single housing with a display screen and several (e.g., "extra-aural") speaker drivers that are arranged to project sound into an ambient environment. For instance, the device may include (at least) two tweeters, two mid-range drivers, and two woofers. Each of the woofers may be disposed at a first distance from a center vertical axis of the housing in opposite horizontal directions, each of the tweeters may be disposed at a second distance from the center vertical axis in opposite horizontal direction, and each of the mid-range drivers may be disposed at a third distance from the center vertical axis in opposite horizontal directions, where the first and second distances are greater than the third distance. In one aspect, the first distance may be greater than the second distance, such that the woofers are positioned wider on the housing than the tweeters with respect to the center vertical axis.

In one aspect, the speaker drivers may be positioned about the multimedia device. For example, the mid-range drivers may be aligned along a first horizontal axis, while the tweeter and woofer are aligned along a second horizontal axis. In this case, the first horizontal axis may be above the display screen, while the second horizontal axis is below the display screen. In another arrangement, all the speaker drivers may be aligned along a (e.g., same) horizontal axis. In some aspects, some speaker drivers may be positioned closer together than others. For instance, each tweeter may be adjacent (e.g., within a distance threshold) to a respective woofer. As another example, the third distance from which each of the mid-range drivers is disposed from the center vertical axis may be between 6 cm-10 cm.

In some aspects, the multimedia device may include a controller that is configured to receive an audio program (e.g., a musical composition) that includes at least one audio signal, and processes the audio program to produce several low-frequency driver signals for the woofers, several mid-frequency driver signals for the mid-range drivers, and several high-frequency driver signals for the tweeters. In one aspect, each (or at least some) of the pluralities of speaker signals include spectral content across non-overlapping frequency ranges with respect to one another. For example, the low-frequency driver signals may include spectral content across a low-frequency range that includes at least one frequency less than 1 kHz, the mid-frequency driver signals may include spectral content across a mid-frequency range that includes at least one frequency between 1 kHz-6 kHz, and the high-frequency driver signals may include spectral content across a high-frequency range that includes at least one frequency greater than 6 kHz. In one aspect, the speaker drivers may be full-range speaker drivers and/or speaker drivers that are specifically designed to output the particular frequency ranges.

In one aspect, the speaker drivers may be arranged to project sound in similar or different directions, with respect to the display screen. For instance, the tweeters and the mid-range drivers may be front-firing speaker drivers, while the woofers are either front-firing speaker drivers or side-firing speaker drivers.

Another aspect of the disclosure is a multimedia device with a different arrangement of speaker drivers. For instance, the device may include a display screen, a first set of speaker drivers that are arranged to receive and output audio content of an audio program across a mid-frequency range, and a second set of speaker drivers that are arranged to receive and output audio content of the audio program across a low-frequency range and a high-frequency range. In addition, the first set of speaker drivers are disposed between the second speaker drivers, and the each of the frequency ranges are non-overlapping ranges. Thus, unlike the previous arrangement in which each speaker driver may output spectral content within a particular frequency range, this arrangement includes speaker drivers that output several frequency ranges.

The above summary does not include an exhaustive list of all aspects of the disclosure. It is contemplated that the disclosure includes all systems and methods that can be practiced from all suitable combinations of the various aspects summarized above, as well as those disclosed in the Detailed Description below and particularly pointed out in the claims. Such combinations may have particular advantages not specifically recited in the above summary.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect of this disclosure are not necessarily to the same aspect, and they mean at least one. Also, in the interest of conciseness and reducing the total number of figures, a given figure may be used to illustrate the features of more than one aspect, and not all elements in the figure may be required for a given aspect.

DETAILED DESCRIPTION

Figure 1:
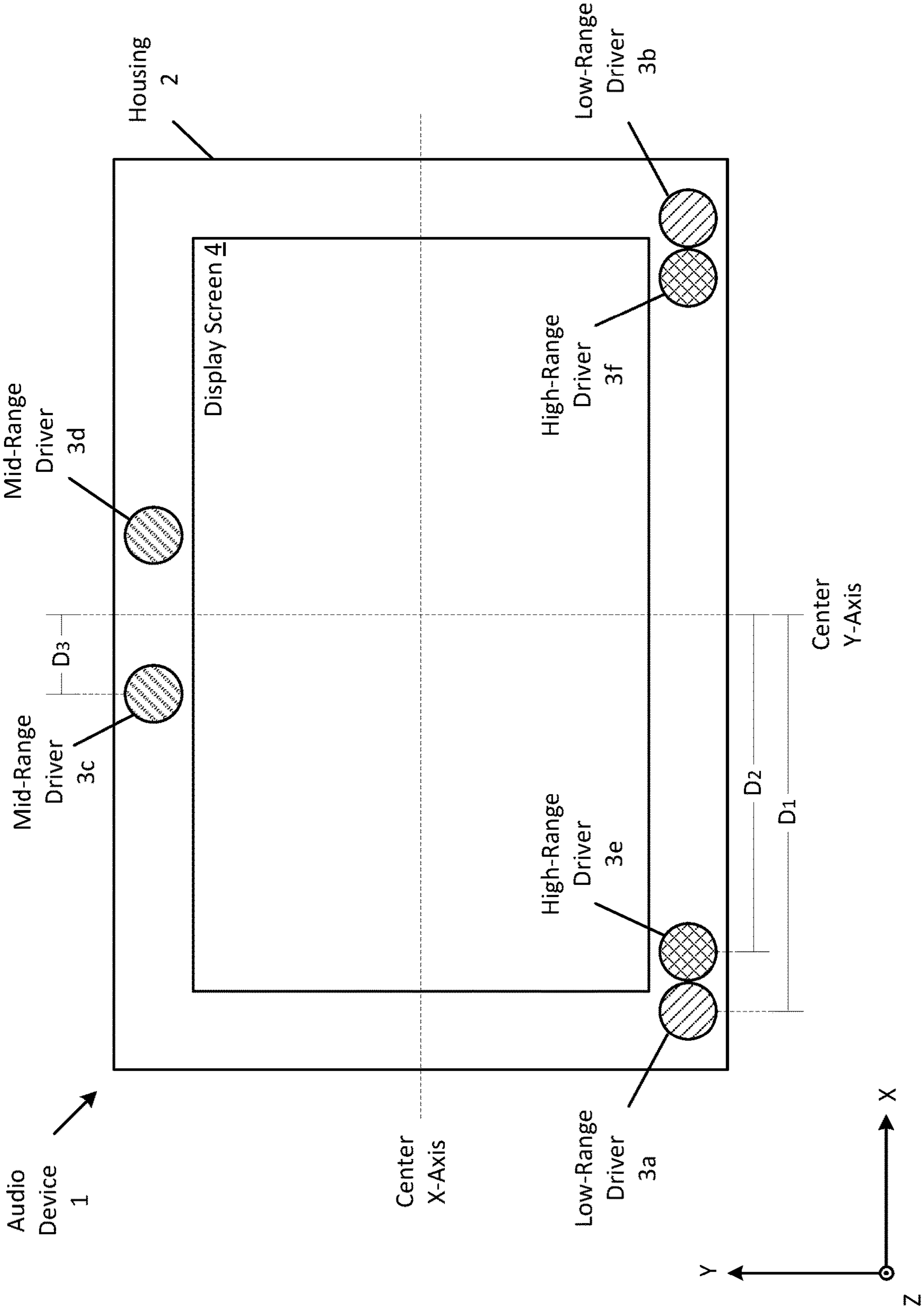
FIG. 1 shows an audio device with several speaker drivers arranged for improving cross-talk cancellation according to one aspect.

Several aspects of the disclosure with reference to the appended drawings are now explained. Whenever the shapes, relative positions and other aspects of the parts described in a given aspect are not explicitly defined, the scope of the disclosure here is not limited only to the parts shown, which are meant merely for the purpose of illustration. Also, while numerous details are set forth, it is understood that some aspects may be practiced without these details. In other instances, well-known circuits, structures, and techniques have not been shown in detail so as not to obscure the understanding of this description. Furthermore, unless the meaning is clearly to the contrary, all ranges set forth herein are deemed to be inclusive of each range's endpoints.

Some audio systems produce spatial audio in which three-dimensional (3D) sound of an audio program (e.g., a musical composition, a motion picture sound track, video game audio content, etc.) provides listeners with an immersive audio experience. To create this 3D sound, the audio systems may provide the program audio as binaural audio signals that are used to drive speakers of a pair of headphones that are worn by the listener. As a result, the audio system may produce a 3D sound space such that the listener perceives sound as being emitted from different virtual sound sources.

Audio systems may successfully produce spatial audio through a pair of headphones, due to the headphones providing noise isolation (e.g., via ear cups positioned on the listener's ears), and directing specific sound into each of the listener's ears (e.g., driving a left speaker driver with one binaural signal and driving a right speaker driver with another binaural signal). Systems that use other audio output devices, however, such as loudspeakers may produce less of an immersive experience. For instance, unlike headphones that direct certain sounds into each of the user's ears, loudspeakers, include one or more speaker drivers that are arranged to output sound into an ambient environment. As a result, when these systems attempt to produce spatial audio (e.g., by driving speakers with binaural audio signals), the sound perceived by the listener may be less immersive due to acoustic crosstalk. For instance, when driving a system with a left loudspeaker and a right loudspeaker with respective binaural audio signals, sound of the left loudspeaker may interfere (or mix) with sound of the right loudspeaker, which may adversely affect spatial cues perceived by the listener. To solve this problem, audio systems may apply crosstalk cancellation (XTC) upon the spatial audio to minimize or reduce the crosstalk at the listener's position.

The effectiveness of XTC is based on an arrangement (and/or number of) speaker drivers that are integrated within an audio device. For example, smaller electronic devices (e.g., smart phones) that include an arrangement of closely positioned drivers may produce a broad (e.g., large) sweet spot, which provides adequate spatial audio effects at low and high frequencies. As the arrangement of (e.g., spacing between) built-in speakers increases for larger audio devices (e.g., a television with built-in speakers), however, the effectiveness of the sweet spot may change at different frequencies. For example, as spacing between speaker drivers increases, the sweet spot for lower frequencies (e.g., below 1 kHz) may provide sufficient spatialization, whereas the size of the sweet spot for higher frequencies (e.g., above 1 kHz) may be reduced.

To solve this problem, the present disclosure describes an electronic device (e.g., a multimedia device) that includes an arrangement of speaker drivers for implementing optimized XTC. In particular, the device includes several different sets of speaker drivers, where each set is designed to output a particular frequency range of an audio program (e.g., a musical composition, etc.). For instance, the device may include two high-range speaker drivers (e.g., tweeters) that output high-frequency audio content (e.g., above 6 kHz) of the audio program, two mid-range speaker drivers (e.g., mid-range drivers) that output mid-frequency audio content (e.g., between 1 kHz-6 kHz) of the audio program, and/or two low-range speaker drivers (e.g., woofers) that output low-frequency audio content (e.g., below 1 kHz). In addition, the speaker drivers may be arranged such each low-range driver is paired with and adjacent to a respective high-range driver. For each pair, the high-range driver may be positioned wider than its respective low-range driver (e.g., further away from a center vertical axis of a housing of the device). Also, the mid-range drivers may be positioned between the pairs of low-range and high-range drivers. this arrangement of the speaker drivers, or more specifically the position of the mid-range speaker drivers being between the pairs of low-range and high-range drivers provide optimized XTC spatialization by providing a larger sweet spot at higher frequencies (e.g., between 1 kHz-6 kHz) by fixing the issue in which extremely positioned built-in speakers are poorly conditioned for higher frequency spatial audio caused by the large distance separation between the pairs of low-range and high-range drivers.

Figure 4:
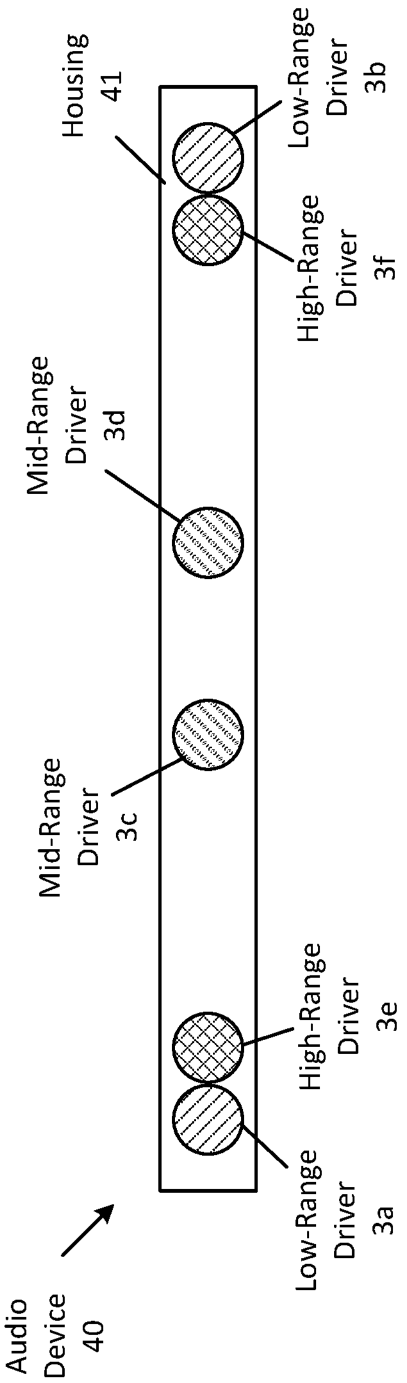
FIG. 4 shows another audio device with another arrangement of speaker drivers according to one aspect.

FIG. 1 shows an audio device with several speaker drivers arranged for improving cross-talk cancellation according to one aspect. Specifically, this figure illustrates an audio device 1 that includes a housing 2 in which six speaker drivers 3*a*-3*f* and a display screen 4 are integrated. For instance, at least some of the elements (e.g., the drivers) may be integrated such that they are fixedly coupled (e.g., mounted) within the housing. In one aspect, the housing may be one (e.g., single) component in which each of the elements are integrated. In one aspect, the audio device may include less or more elements integrated within the housing. For instance, the audio device may not include a display screen, as illustrated in FIG. 4. In another aspect, the device may include a different number of speaker drivers. In some aspects, the device may include one or more microphones that are arranged to capture ambient sound as microphone signals.

In one aspect, the audio device 1 is a multimedia device that is designed to output video data (e.g., still images, video images, etc.) via the display screen 4 and/or output audio data of an audio program via one or more of the speaker drivers 3*a*-3*f* For example, the multimedia device may be any type of display device, such as a television or video monitor (e.g., with built-in speaker drivers). In one aspect, the display screen 4 may be any type of display device that is configured to display video data. For example, the display screen may utilize digital light projection, OLEDs, LEDs, uLEDs, liquid crystal on silicon, laser scanning light source, or any combination of these (or other) technologies.

As another example, the audio device 1 may be any type of electronic device (e.g., that includes one or more processors, memory, etc.) that can perform audio signal processing operations and/or display video data. As an example, the device may be a desktop computer, a laptop, etc. In another aspect, the electronic device may be a portable (or handheld) device, such as a tablet computer, a smart phone, etc. In some aspects, the device may be a wearable device, such as smart glasses. In this case, the device may include at least one display screen (e.g., a display screen for each eye of the user), and several speaker drivers arranged about the frame of the glasses.

In one aspect, the speaker drivers may be "extra-aural" speaker drivers that are arranged to project sound into an ambient environment, which is in contrast to "intra-aural" speaker drivers that are arranged to project sound directly into a listeners' ears (e.g., speakers of over-the-ear headphones. As shown, the speaker drivers 3*a*-3*f* are each specifically designed (e.g., according to a manufacturer's specification) for sound output at certain frequency bands. For instance, the low-range drivers (or woofers) 3*a* and 3*b* may be designed for outputting low-frequency audio content, the mid-range drivers 3*c* and 3*d* may be designed for outputting mid-frequency audio content, and the high-range drivers (or tweeters) 3*e* and 3*f* may be designed for outputting high-frequency audio content. More about the different drivers outputting different spectral audio content is described herein. In another aspect, the speaker drivers (or at least one of the speaker drivers) may be "full-range" or ("full-band") drivers that reproduce as much of an audible frequency range as possible (e.g., according to a manufacturer's specification). In one aspect, when a speaker driver is a full-range driver, the driver may be driven by the audio device to output specific audio content across a frequency range. For example, when the low-range driver 3*a* is a full-range driver, the audio device may use a driver signal that includes spectral audio content of the audio program across a low-frequency range to drive the driver 3*a*. More about driving the drivers is described herein.

As described herein, the speaker drivers 3*a*-3*f* may be arranged for implementing XTC for spatial audio. Specifically, audio device 1 includes two pairs of low-range and high-range drivers (driver 3*a* is paired with driver 3*e*, and driver 3*b* is paired with driver 3*f*) that are positioned at opposite bottom portions (e.g., corners) of the housing 2 (e.g., below the display screen 4). The device also includes a pair of mid-range drivers 3*c* and 3*d* that are positioned at a top portion of the housing (e.g., above the display screen 4).

In one aspect, the speaker drivers 3*a*-3*f* may be symmetrically arranged about a center vertical (Y-axis) of the housing 2, such that the positions of the speaker drivers to the left of the Y-axis (e.g., drivers 3*a*, 3*c*, and 3*f*, are reflections of the positions of the speaker drivers to the right of the Y-axis (e.g., drivers 3*b*, 3*d*, and 3*f*). In another aspect, the speaker drivers may be asymmetrically arranged. As shown, the low-range drivers 3*a* and 3*b* are each disposed at a first distance ("$D_1$") from the Y-axis, in opposite horizontal directions from one another, and the high-range drivers 3*e* and 3*f* are each disposed at a second distance ("$D_2$") from the Y-axis, in opposite horizontal directions from one another, where $D_1$ is greater than $D_2$. In addition, each of the mid-range drivers is disposed at a third distance ("$D_3$") from the Y-axis, in opposite horizontal directions, where $D_1$ and $D_2$ are greater than $D_3$. As a result, both of the mid-range drivers are positioned between both pairs of low-range and high-range drivers along the X-axis. In one aspect, $D_3$ may be a distance between 6 cm-10 cm, or more particularly, 8 cm, such that both mid-range drivers may be separated from one another by a particular distance (e.g., between 12 cm-20 cm).

In one aspect, low-range and high-range drivers are paired with one another such that both drivers are adjacent to one another. For example, both drivers 3*a* and 3*e* may be adjacent to one another such that both drivers are separated (e.g., along the X-axis) by a minimal distance threshold). In one aspect, the distance threshold may be a smallest amount of separation between the two elements that is necessary for integrating the two elements within the housing 2. In another aspect, the pairs of low-range and high-range drivers may be adjacent such that (e.g., at least a portion of) both drivers are touching each other (e.g., an outer side surface of both drivers 3*a* and 3*e* are in contact with one another, as illustrated in this figure).

In one aspect, at least some of the speaker drivers may be aligned with each other along at least one common axis (e.g., that runs through a center point of the speaker drivers). For instance, the mid-range drivers 3*c* and 3*d* are aligned along a (e.g., first) horizontal axis (not shown) that is above the display screen 4, while the low-range drivers 3*a* and 3*b* and the high-range drivers 3*e* and 3*f* are aligned along another (e.g., a second) horizontal axis (not shown) that is below the display screen 4. In another aspect, different speaker drivers may be aligned along different horizontal axes. For instance, the low-range drivers may be aligned along a different horizontal axis than a horizontal axis along which the high-range drivers are aligned. In some aspects, all of the speaker drivers may be deposed (aligned) along a same horizontal axis. For example, the mid-range drivers may be disposed below the display screen and may be aligned along the same axis as the other drivers.

In one aspect, at least some of the speaker drivers may be positioned differently on the housing 2. For example, rather than the low-range drivers and high-range drivers being aligned along a (common) horizontal axis, at least some of the drivers may be aligned along a vertical axis. In this example, the low-range driver 3*a* may be stacked above the high-range driver 3*e*, such that the low-range driver is closer to the X-axis than the high-range driver. As another example, the speaker drivers may be transposed about the X-axis. Specifically, the mid-range drivers may be below the display screen, while the low-range and high-range drivers may be above the display screen.

As described herein, the audio device 1 may have a different number of speaker drivers. For instance, the device may include more mid-range drivers, such as three or four drivers. In one aspect, additional drivers may be positioned similarly as the drivers illustrated in this figure, such that the positions of the additional drivers may be symmetrical about the Y-axis. For example, when the device includes four mid-range drivers, two may be positioned to the left of the Y-axis, and two may be positioned to the right. In one aspect, the audio device may only include an even number of mid-range drivers. In another aspect, the device may include additional low-range drivers and/or high-range drivers. For example, the device may include additional pairs of low-range and high-range drivers. In another aspect, the device may include any number of low-range and high-range drivers. For example, the device may include additional low-range drivers that are positioned adjacent to one or more high-range drivers.

In one aspect, each of the drivers may be front-firing speaker drivers (e.g., with respect to the display screen) such that the drivers are arranged to project sound in a same (e.g., Z-) direction towards which the display screen is facing, as illustrated in this figure. In another aspect, at least some of the speaker drivers may be side-firing speaker drivers that are arranged to project sound out of a side of the housing 2 (e.g., in an X-direction). For example, the low-range and high-range drivers may be side-firing drivers, such that drivers 3*a* and 3*e* project sound in a left X-direction and drivers 3*b* and 3*f* project sound in a right X-direction. As another example, the low-range drivers may be side-firing drivers, while the high-range drivers may be front-firing drivers.

Figure 2:
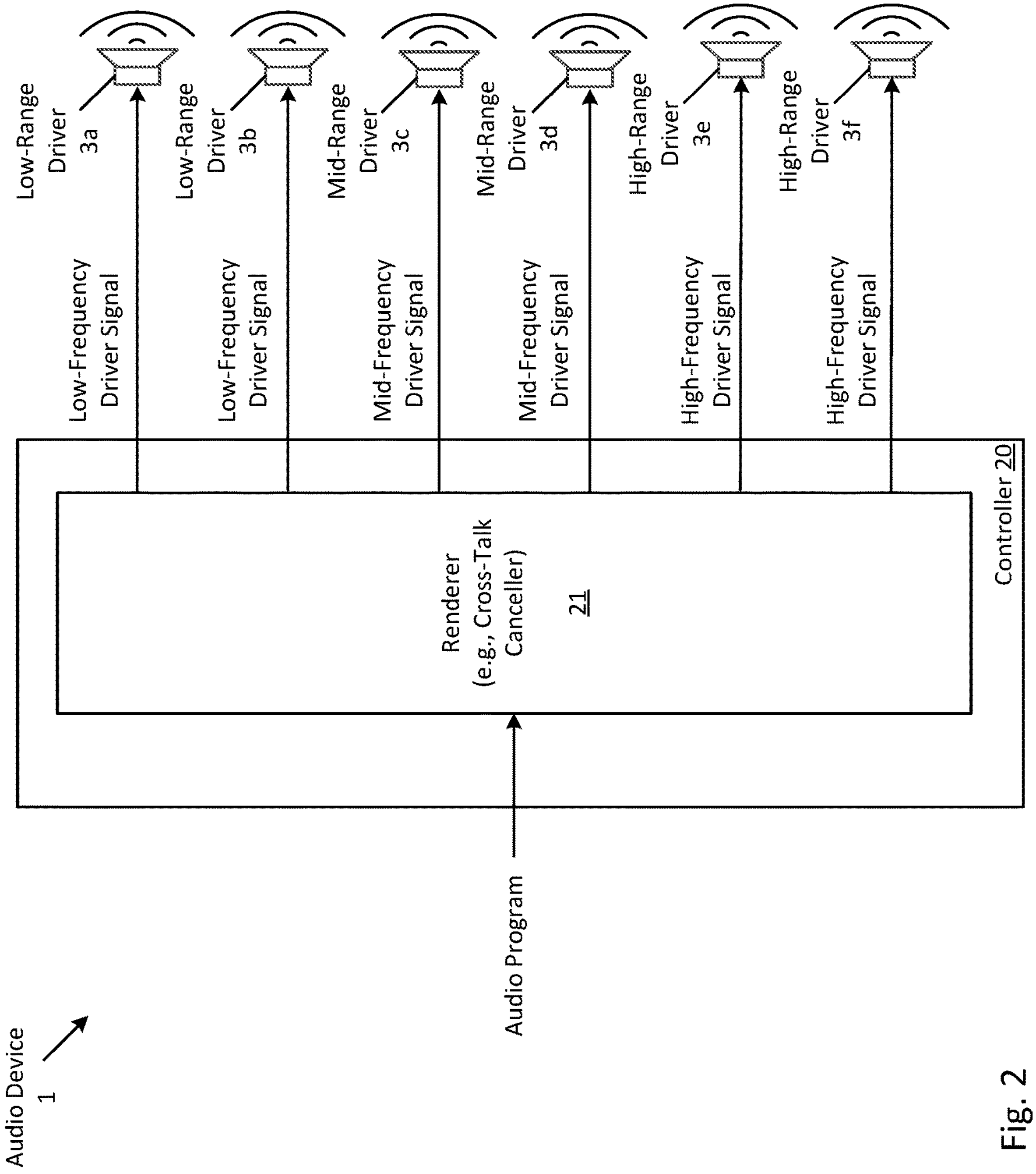
FIG. 2 shows a block diagram of the audio device according to one aspect.

FIG. 2 shows a block diagram of the audio device according to one aspect. Specifically, this figure shows the audio device 1 that includes a controller (programmed processor) 20 and the speaker drivers 3*a*-3*f*. In one aspect, the controller may be a special-purpose processor such as an application-specific integrated circuit (ASIC), a general purpose microprocessor, a field-programmable gate array (FPGA), a digital signal controller, or a set of hardware logic structures (e.g., filters, arithmetic logic units, and dedicated state machines). In some aspects, the controller may include memory that is having stored thereon instructions, which program the (or at least a portion of) the controller to perform at least some of the audio signal processing operations described herein.

As shown, the controller 20 includes a renderer 21 that may be configured to perform audio signal processing operations, such as operating as a cross-talk canceller that performs XTC operations. In one aspect, the renderer 21 is configured to receive an audio program that includes at least one audio signal that includes user-desired audio content (e.g., a musical composition, as described herein). For example, (e.g., a processor or the controller of) the audio device may be running a media player software application that is retrieving and providing the program audio to the renderer. For instance, the audio program may be retrieved from local memory (e.g., of the audio device) and/or from another electronic device that is communicatively coupled (e.g., via any wireless connection, such as a BLUETOOTH connection) with the audio device. In this case, the audio program may be streamed from the other electronic (local) device (e.g., via the wireless connection or a wired connection) or a remote electronic device (e.g., via the Internet), such as a remote server. In one aspect, the audio signal may be a single (mono) audio channel. In another aspect, the audio program may be a two-channel input, namely left and right channels (each channel as an audio signal) of a stereophonic recording (e.g., of a musical work). Or, the audio program may be more than two audio channels, such as for example the entire audio soundtrack in 5.1-surround format of a motion picture film or movie.

In one aspect, the received audio program may include spatial audio data that has been spatially encoded upon one or more audio signals. In some aspects, the spatial audio data may include an angular/parametric reproduction of a virtual sound source, such as Higher Order Ambisonics (HOA) representation of a sound space that includes an audio content (e.g., positioned at a virtual position within the space), a Vector-Based Amplitude Panning (VBAP) representation of the sound, etc. In another aspect, the spatial audio data may include a channel-based reproduction of the audio content, such as multi-channel audio in a surround sound multi-channel format (e.g., 5.1, 7.1, etc.). In some aspects, the spatial audio data may include an object-based representation of the audio content that includes one or more audio channels that has (at least a portion of) the audio content and metadata that describes the sound. For instance, the metadata may include spatial characteristics (e.g., elevation, azimuth, distance, etc.) of the audio content. In another aspect, the spatial audio data may include binaural audio signals.

In another aspect, the program audio may include other types of audio content. For example, the one or more audio signals may include a downlink signal that is obtained by the audio device during a telephone call with another electronic device.

The renderer 21 is configured to process the received audio program to produce several different audio signals, each containing at least a portion of the spectral audio content of the audio program. Specifically, the renderer may perform a XTC algorithm based on the one or more audio signals of the audio program to produce the one or more driver signals. For example, the renderer may perform the algorithm by mixing and/or delaying (e.g., by applying one or more XTC filters upon) the audio signals of the audio program to produce one or more XTC audio signals. In one aspect, the renderer may produce one or more first XTC audio signals that contains (at least a portion of) audio content of the audio program that is to be primarily heard at one ear (e.g., a left ear) of the listener who is within a sweet spot (e.g., which may be in front of and facing the audio device 1), and produce one or more second XTC audio signals that contains audio content that is to be primarily heard at another ear of the user (e.g., right ear), when used to drive one or more of the speaker drivers. To illustrate, when the audio program is a stereophonic recording, the renderer may combine at least a portion of one channel (e.g., a right channel) with another channel (e.g., a left channel), along with a delay, to produce a left-XTC audio signal.

The renderer is configured to apply one or more audio crossover filters (e.g., low-pass filter, high-pass filter, bandpass filter, etc.) upon the one or more XTC audio signals (and/or one or more audio signals of the audio program) to produce one or more driver signals containing varying portions of the audio program's spectral content for driving one or more of the speaker drivers of the audio device. For instance, one or more low-pass filters may be applied to produce the one or more low-frequency driver signals, one or more bandpass filter may be applied to produce one or more mid-frequency driver signals, and one or more high-pass filters may be applied to produce one or more high-frequency driver signals, where the audio signals are used to drive corresponding speaker drivers 3*a*-3*f*, as shown.

In one aspect, the particular driver signals supplied to the speaker drivers 3*a*-3*f* may be produced such that they contain spectral content of the audio program that is to be directed towards a particular side (e.g., ear) of a listener who is within the sweet spot. Returning to the previous example, the renderer may apply the one or more audio filters upon the first XTC audio signals to produce a low-frequency driver signal for driver 3*a*, the mid-frequency driver signal for driver 3*c*, and the high-frequency driver signal for driver 3*e*, since sound produced by these speaker drivers may be primarily heard (or directed towards) a left ear of a listener who is in front of the audio device.

In one aspect, each of the three groups of driver signals may include spectral content across non-overlapping frequency ranges with respect to one another. For example, the low-frequency driver signals may include spectral content (e.g., of the XTC audio signals) across a low-frequency range that includes at least one frequency less than 1 kHz, the mid-frequency driver signals may include spectral content across a mid-frequency range that includes at least one frequency between 1 kHz-6 kHz, and the high-frequency driver signals may include spectral content across a high-frequency range that includes at least one frequency greater than 6 kHz. In one aspect, each group of driver signals may include different (or similar) spectral content across the same frequency ranges. In another aspect, similar driver signals may contain spectral content across different frequency ranges (e.g., the low-frequency driver signals may contain content across different low-frequency ranges). In another aspect, the frequency ranges may be different, such as the mid-frequency range being larger (e.g., between 100 Hz-6 kHz). In some aspects, at least some of the frequency ranges may overlap.

In one aspect, the renderer may be configured to perform one or more other audio processing operations. For example, the renderer may be configured to spatially render the audio program by applying one or more spatial filters, such as head-related transfer functions (HRTFs). For example, the received audio program may include object-based audio that includes one or more audio signals and metadata that describes the sound (e.g., a virtual position at which the sound is to be emitted). The metadata may include spatial characteristics (e.g., elevation, azimuth, distance, etc.) of the audio content. From the metadata the renderer may determine (or select) one or more HRTFs, and may apply the HRTFs upon the received one or more audio signals to produce binaural audio signals, to which the render may perform the XTC operations, as described herein. In one aspect, the spatial filters may be generic or predetermined spatial filters (e.g., determined in a controlled setting, such as a laboratory), which may be applied by the renderer for a predetermined position that is generally optimized for one or more listeners and/or the sweet spot in front of the audio device. In another aspect, the spatial filters may be user-specific according to one or more measurements of a listener's head (e.g., which may be determined based on user input or may be determined automatically by the audio device. For instance, the system may determine the HRTFs, or equivalently, a head-related impulse response (HRIR) that is based on the listener's anthropometrics.

In one aspect, the renderer may perform beamformer operations to process the received one or more audio signals of the audio program. Specifically, the renderer may apply beamforming weights (or weight vectors) to the audio signals to produce one or more output beamformer signals, which when used to drive one or more of the speaker drivers causes the audio device to produce a directional beam pattern that contains at least a portion of the audio content of the audio program. For instance, the renderer may apply one or more audio crossover filters upon the output beamformer signals to produce the driver signals that include spectral content across various frequency ranges, as described herein.

As described thus far, the audio processing operations may be performed by the renderer 21 that is a part of the audio device 1. In one aspect, at least some of the operations may be performed by another electronic device that is communicatively coupled with the audio device. For instance, the other electronic device may perform the XTC operations upon the audio program and provide one or more driver signals to the audio device 1 for driving the speaker drivers 3*a*-3*f*. In one aspect, the other electronic device may be any of the devices described herein. In another aspect, the other electronic device may be designed to stream video and/or audio to an audio device, such as a digital media player.

Figure 3:
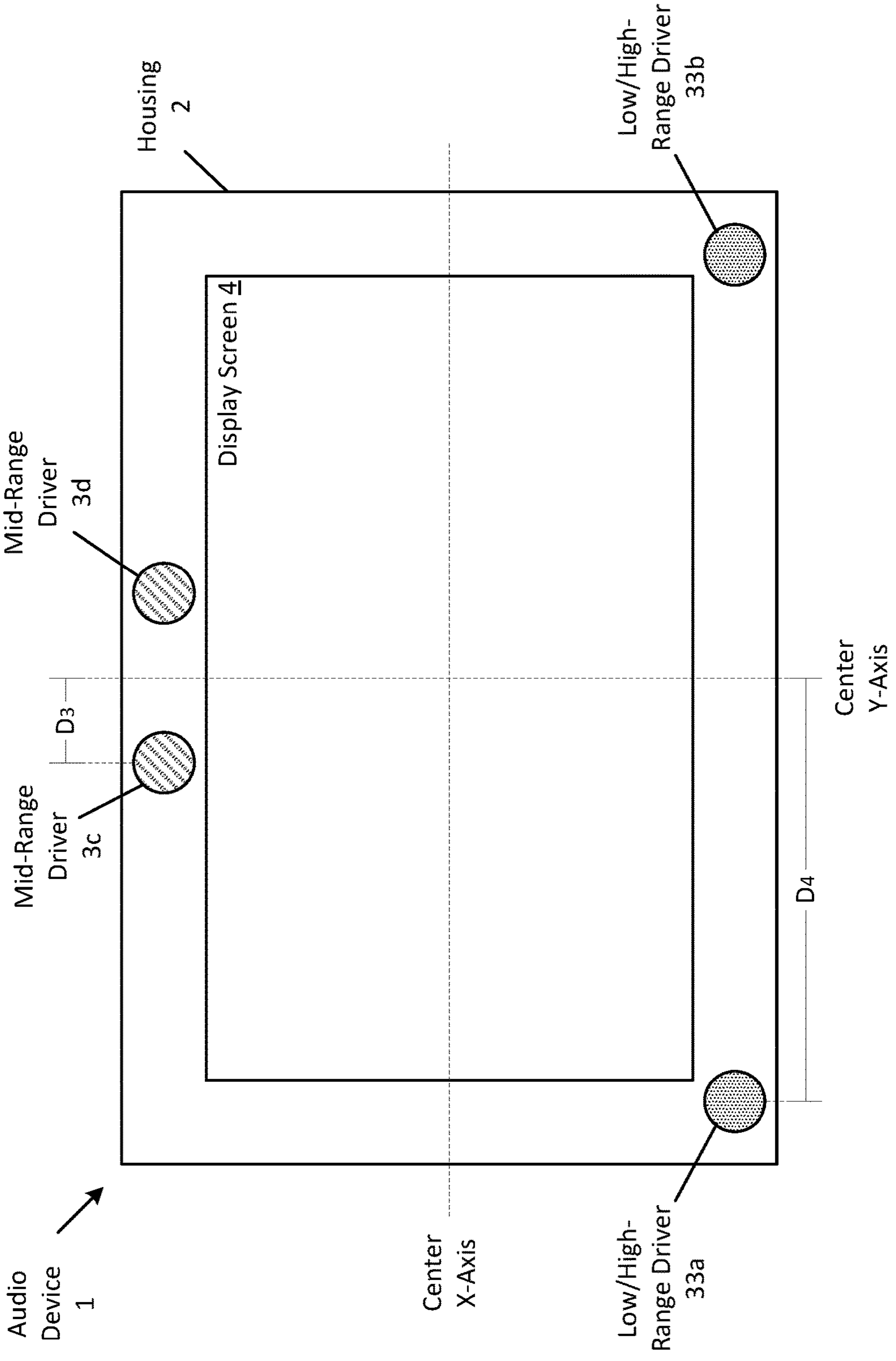
FIG. 3 shows the audio device with another arrangement of speaker drivers according to another aspect.

FIG. 3 shows the audio device 1 with another arrangement of speaker drivers according to another aspect. In particular, the audio device illustrated in this figure includes the two mid-range drivers 3*c* and 3*d* and low/high-range drivers 33*a* and 33*b*, each of which replaces the pairs of low-range and high-range drivers illustrated in FIG. 1. For instance, the audio device includes driver 33*a* instead of driver 3*a* and 3*e*, and includes driver 33*b* instead of driver 3*b* and 3*f* In one aspect, these single drivers are specifically designed for sound output at low-frequency ranges and/or high-frequency ranges. Thus, the mid-range drivers may be arranged to (e.g., only) receive and output audio content of the audio program across a mid-frequency range, and the low/high range drivers may be arranged to receive and output audio content of the audio program across a low-frequency range and/or a high-frequency range. Specifically, the renderer 21 may be configured to apply one or more crossover filters (e.g., bandstop filters) upon the audio program to produce low/high driver signals that include spectral content of the audio program across the low-frequency range and/or the high-frequency range. In one aspect, the drivers 33*a* and 33*b* may be able to reproduce sound at similar frequency ranges described herein, such as reproducing sounds less than 1 kHz and reproducing sounds greater than 6 kHz. In this case, to drive the speakers the renderer 21 may be configured to produce driver signals that contain spectral content of the audio program across one or both of the low/high frequency ranges described herein.

As shown, the low/high range drivers 33*a* and 33*b* are each disposed at a fourth distance ("$D_4$") from the Y-axis, in opposite horizontal directions, where $D_4$ is greater than $D_3$. Thus, similar to the speaker driver arrangement in FIG. 1, the mid-range drivers are disposed between the low/high-range drivers along the X-axis.

FIG. 4 shows another audio device with another arrangement of speaker drivers according to one aspect. In particular, this figure shows an audio device 40 that includes at least some of the components of audio device 1 but does not include a display screen. For instance, the audio device 40 includes speaker drivers 3*a*-3*f* that are integrated into a housing 41. In one aspect, the audio device may also include one or more processors that are configured to perform rendering operations, as described in FIG. 2. In one aspect, the audio device 40 may be any audio device that does not include a display screen, such as a stand-alone loudspeaker (e.g., a soundbar). In some aspects, the audio device 40 may include a similar arrangement of the speaker drivers as audio device 1. For instance, the speaker drivers may have a similar arrangement along a (center) X-axis of the audio device, such as similar speaker drivers being disposed at a same distance from a center Y-axis (e.g., low-range drivers 3*a* and 3*b* being disposed at a same distance from the Y-axis, in opposite horizontal directions from one another).

As shown, the speaker drivers 3*a*-3*f* are aligned along a horizontal axis, and are each front-firing speaker drivers. In one aspect, at least some of the speaker drivers may be arranged differently. For instance, one or more of the speaker drivers may not be aligned along a common X-axis (e.g., the mid-range drivers 3*c* and 3*d* may be positioned higher along a Y-axis). In another aspect, at least some of the speaker drivers may be either front-firing, side-firing, back-firing, or top-firing speaker drivers.

In one aspect, FIG. 4 shows a device having a housing, where the device includes several elements integrated into the housing. For instance, the device includes (at least) six speaker drivers that are in a particular arrangement, along a horizontal axis with respect to the device. Specifically, two (low-range) drivers may be spaced apart at a first distance, two (high-range) drivers may be spaced apart at a second distance, and two (mid-range) drivers may be spaced apart at a third distance, where the second distance is greater than the third distance and the first distance is greater than the second distance.

Figure 5:
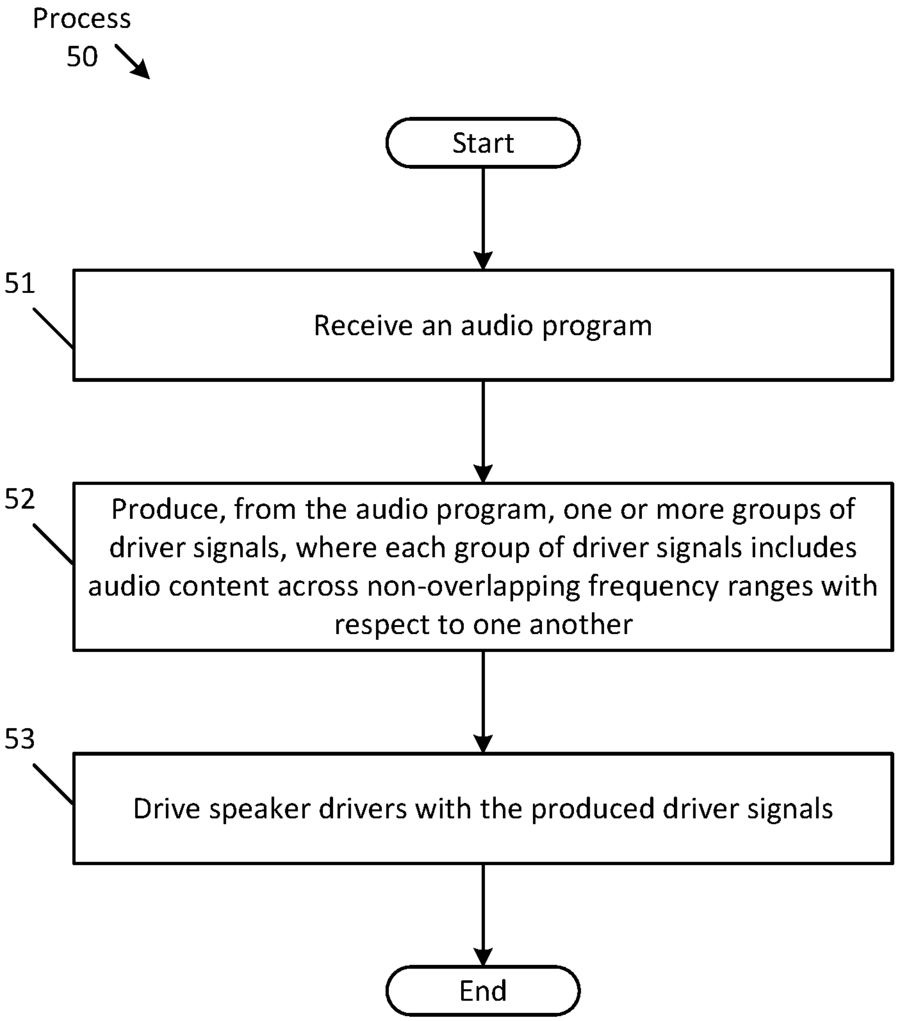
FIG. 5 is a flowchart of one aspect of a process in which the audio device performs cross-talk cancellation according to one aspect.

FIG. 5 is a flowchart of one aspect of a process 50 in which the audio device performs cross-talk cancellation according to one aspect. In one aspect, (e.g., at least some of the operations of) the process 50 is performed by (e.g., controller 20 of the) audio device 1. In particular, at least some of the operations of the process may be performed by the renderer 21 of the controller.

The process 50 begins by the controller 20 receiving an audio program (at block 51). In particular, the audio program may include user-desired audio content (e.g., a musical composition) that includes one or more audio signals, which may be in an audio format. The controller produces, from the audio program, one or more groups of (e.g., having two or more) audio signals, where each group of driver signals includes audio content across-non-overlapping frequency ranges with respect to one another (e.g., other produced groups) (at block 52). Specifically, the renderer 21 may process the audio program may performing one or more audio signal processing operations. For example, the renderer may perform a XTC algorithm based on (at least one of) the audio signals of the audio program to produce the driver signals, as described herein. For instance, the renderer may produce a first group of low-frequency driver signals (e.g., for driving one or more woofers), which include low-frequency audio content of the audio program, a second group of mid-frequency driver signals (e.g., for driving one or more mid-range drivers), which include mid-frequency audio content of the audio program, and a third group of high-frequency driver signals (e.g., for driving one or more tweeters), which include high-frequency audio content of the audio program. In another aspect, the renderer may produce more or less groups of driver signals, where each group may include similar or different audio content of the audio program. The renderer drives speaker drivers of the audio device with the produced driver signals (at block 53).

Some aspects may perform variations of the process 50 described in this figure. For example, the specific operations of at least some of the processes may not be performed in the exact order shown and described. The specific operations may not be performed in one continuous series of operations and different specific operations may be performed in different aspects.

In one aspect, the (first) distance, between a woofer (e.g., driver 3*a* in FIG. 1) and a center vertical axis of the audio device is greater than the (second) distance between a tweeter (e.g., drivers 3*e*), which is adjacent to the woofer, and the center vertical axis. In another aspect, a (third) distance between a mid-range driver (e.g., driver 3*c*) and the center vertical axis is between 6 cm-10 cm. In another aspect, at least some of the tweeters and/or mid-range drivers described herein may be front-firing drivers (e.g., drivers that project sound away from the audio device 1 in the Z-direction, as shown in FIG. 1, whereas at least some of the woofers may be either front-firing drivers or side-firing drivers (e.g., drivers that project sound away from the audio device in the X-direction).

Personal information that is to be used should follow practices and privacy policies that are normally recognized as meeting (and/or exceeding) governmental and/or industry requirements to maintain privacy of users. For instance, any information should be managed so as to reduce risks of unauthorized or unintentional access or use, and the users should be informed clearly of the nature of any authorized use.

As previously explained, an aspect of the disclosure may be a non-transitory machine-readable medium (such as microelectronic memory) having stored thereon instructions, which program one or more data processing components (generically referred to here as a "processor") to perform the network operations and/or audio signal processing operations, as described herein. In other aspects, some of these operations might be performed by specific hardware components that contain hardwired logic. Those operations might alternatively be performed by any combination of programmed data processing components and fixed hardwired circuit components.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A multimedia device having a single housing, comprising the following elements integrated into the single housing:

a display screen;
a first tweeter;
a second tweeter;
a first mid-range driver;
a second mid-range driver;
a first woofer; and
a second woofer,
wherein the first woofer is disposed at a first distance from a center vertical axis in a first horizontal direction and the second woofer is disposed at the first distance from the center vertical axis in a second horizontal direction that is opposite to the first horizontal direction,
wherein the first tweeter is disposed at a second distance from the center vertical axis of the single housing in the first horizontal direction and the second tweeter is disposed at the second distance from the center vertical axis in the second horizontal direction,
wherein the first mid-range driver is disposed at a third distance from the center vertical axis in the first horizontal direction and the second mid-range driver is disposed at the third distance from the center vertical axis in the second horizontal direction,
wherein the first and second distances are greater than the third distance,
wherein the first tweeter, the first woofer, and the first mid-range driver are a first group of speaker drivers and the second tweeter, the second woofer, and the second mid-range driver are a second group of speaker drivers, wherein, for each group of speaker drivers, a distance between a respective tweeter to a respective woofer is smaller than another distance between a respective mid-range driver to the respective tweeter or the respective woofer.

2. The multimedia device of claim 1, wherein the first mid-range driver and the second mid-range driver are aligned along a first horizontal axis, and wherein the first tweeter and the second tweeter and the first woofer and the second woofer are aligned along a second horizontal axis.

3. The multimedia device of claim 2, wherein the first horizontal axis is above the display screen and the second horizontal axis is below the display screen.

4. The multimedia device of claim 1, wherein the first tweeter, the second tweeter, the first mid-range driver, the second mid-range driver, the first woofer, and the second woofer are all aligned along a horizontal axis.

5. The multimedia device of claim 1 further comprising a controller that is configured to:

receive an audio program comprising at least one audio signal; and process the audio program to produce a plurality of low-frequency driver signals for the first woofer and the second woofer, a plurality of mid-frequency driver signals for the first mid-range driver and the second mid-range driver, and a plurality of high-frequency driver signals for the first tweeter and the second tweeter.

6. The multimedia device of claim 5, wherein the plurality of low-frequency driver signals include spectral content across a low-frequency range that includes at least one frequency less than 1 kHz, the plurality of mid-frequency driver signals include spectral content across a mid-frequency range that includes at least one frequency between 1 kHz-6 kHz, and the plurality of high-frequency driver signals include spectral content across a high-frequency range that includes at least one frequency greater than 6 kHz.

7. The multimedia device of claim 1, wherein the distance between the respective tweeter and the respective woofer of each group is a smallest amount of separation necessary for integrating both elements within the single housing.

8. The multimedia device of claim 1, wherein each of the elements are separate electronic devices, and portions of the respective tweeter and the respective woofer of each group are touching each other.

9. An electronic device, comprising:

a display screen;

first, second, third, fourth, fifth, and sixth speaker drivers;

a housing in which the display screen and first-sixth speaker drivers are integrated;

a processor; and memory having instructions which when executed by the processor causes the electronic device to:

receive an audio program;

produce, from the audio program, a first plurality of driver signals that include audio content of the audio program across a low-frequency range, a second plurality of driver signals that include audio content of the audio program across a mid-frequency range, and a third plurality of driver signals that include audio content of the audio program across a high-frequency range, wherein audio content of the first, second and third pluralities of driver signals are across non-overlapping frequency ranges with respect to each other; and drive the first and second speaker drivers with the first plurality of driver signals, the third and fourth speaker drivers with the second plurality of driver signals, and the fifth and sixth speaker drivers with the third plurality of driver signals, wherein the first and second speaker drivers are spaced apart in a horizontal direction by a first distance, the third and fourth speaker drivers are spaced apart in the horizontal direction by a second distance, and the fifth and sixth speaker drivers are spaced apart in the horizontal direction by a third distance, wherein the first and third distances are greater than the second distance, wherein a fourth distance between the first speaker driver to fifth speaker drivers is less than a fifth distance between the third speaker driver to the first speaker driver or the fifth speaker driver.

10. The electronic device of claim 9, wherein the first and second speaker drivers are separated in the horizontal direction by a center vertical axis of the housing such that both the first and second speaker drivers are equidistant from the center vertical axis, the third and fourth speaker drivers are separated in the horizontal direction by the center vertical axis of the housing such that both the third and fourth speaker drivers are equidistant from the center vertical axis, and the fifth and sixth speaker drivers are separated in the horizontal direction by the center vertical axis of the housing such that both the fifth and sixth speaker drivers are equidistant from the center vertical axis.

11. The electronic device of claim 9, wherein the first, second, fifth, and sixth speaker drivers are disposed along a first horizontal axis, and the third and fourth speaker drivers are disposed along a second horizontal axis.

12. The electronic device of claim 11, wherein the first horizontal axis is above the display screen and the second horizontal axis is below the display screen.

13. The electronic device of claim 9, wherein the first, second, third, and fourth speaker drivers are front-firing drivers, wherein the fifth and sixth speaker drivers are both either front-firing drivers or side-firing drivers.

14. The electronic device of claim 9, wherein the instructions to produce comprises instructions to:

producing one or more crosstalk cancellation (XTC) audio signals by applying one or more XTC filters upon a portion of the audio program; and applying one or more audio crossover filters upon the one or more XTC audio signals.

15. The electronic device of claim 14, wherein the portion of the audio program comprises one or more audio signals with spatial audio data, wherein the instructions to produce comprises instructions to apply the one or more audio crossover filters upon stereo audio signals of the audio program.

16. The electronic device of claim 14, wherein the first, third, and fifth speaker drivers are driven to output sound of the audio program to be heard through a left ear of a listener, and wherein the second, fourth, and sixth speaker drivers are driven to output sound of the audio program to be heard through a right ear of the listener.

17. A system comprising:

a display screen;

a first plurality of speaker drivers;

a second plurality of speaker drivers, wherein the first plurality of speaker drivers are disposed between the second plurality of speaker drivers;

at least one processor; and memory having stored therein instructions which when executed by the at least one processor causes the system to:

receive an audio program that comprises audio content across a low-frequency range, a mid-frequency range, and a high-frequency range, which are non-overlapping ranges;

produce a first set of driver signals that has a first portion of the audio program and a second set of driver signals that has a second portion of the audio program, wherein the first portion is different than the second portion such that the second portion includes the audio content across only the low-frequency range and the high-frequency range, while the first portion includes the audio content across only the mid-frequency range;

drive the first plurality of speaker drivers using at least one driver signal of the first set of driver signals to output the audio content across the mid-frequency range; and drive the second plurality of speaker drivers using at least one driver signal of the second set of driver signals to output the audio content across the low-frequency range and the high-frequency range.

18. The system of claim 17, wherein the first plurality of speaker drivers and the second plurality of speaker drivers are all disposed along a first horizontal axis, or the first plurality of speaker drivers are disposed along the first horizontal axis and the second plurality of speaker drivers are disposed along a second horizontal axis.

19. The system of claim 17, wherein the first plurality of speaker drivers are front-firing drivers, wherein the second plurality of speaker drivers are either front-firing or side-firing drivers.

20. The system of claim 17, wherein the first plurality of speaker drivers and the second plurality of speaker drivers are full-range speaker drivers.

21. The system of claim 17, wherein the first plurality of speaker drivers are mid-range speaker drivers, and the second plurality of speaker drivers are full-range speaker drivers.

* * * * *